(12) United States Patent
Fukuda et al.

(10) Patent No.: US 10,081,157 B2
(45) Date of Patent: Sep. 25, 2018

(54) FIBER-REINFORCED COMPOSITE MATERIAL

(71) Applicants: JX NIPPON OIL & ENERGY CORPORATION, Tokyo (JP); SUBARU CORPORATION, Tokyo (JP)

(72) Inventors: Yoshihiro Fukuda, Tokyo (JP); Takayuki Matsumoto, Tokyo (JP); Masaki Minami, Tokyo (JP); Naoyuki Sekine, Tokyo (JP); Masanori Nakajima, Tokyo (JP)

(73) Assignees: JX NIPPON OIL & ENERGY CORPORATION, Chiyoda-ku, Tokyo (JP); SUBARU CORPORATION, Shibuya-ku, Tokyo (JP)

( * ) Notice: Subject to any disclaimer, the term of this patent is extended or adjusted under 35 U.S.C. 154(b) by 214 days.

(21) Appl. No.: 14/378,726

(22) PCT Filed: Feb. 12, 2013

(86) PCT No.: PCT/JP2013/053208
§ 371 (c)(1),
(2) Date: Aug. 14, 2014

(87) PCT Pub. No.: WO2013/122033
PCT Pub. Date: Aug. 22, 2013

(65) Prior Publication Data
US 2015/0056882 A1 Feb. 26, 2015

(30) Foreign Application Priority Data
Feb. 15, 2012 (JP) ................. 2012-030624

(51) Int. Cl.
| | | |
|---|---|---|
| *B32B 5/28* | (2006.01) | |
| *B32B 5/26* | (2006.01) | |
| *C08J 5/24* | (2006.01) | |
| *C08G 73/02* | (2006.01) | |
| *B32B 5/02* | (2006.01) | |

(Continued)

(52) U.S. Cl.
CPC ........... *B32B 5/26* (2013.01); *B32B 5/022* (2013.01); *B32B 5/12* (2013.01); *B32B 5/28* (2013.01); *C08G 73/0233* (2013.01); *C08J 5/24* (2013.01); *B32B 2250/05* (2013.01); *B32B 2250/20* (2013.01); *B32B 2260/023* (2013.01); *B32B 2260/046* (2013.01); *B32B 2262/106* (2013.01); *B32B 2264/0264* (2013.01); *B32B 2264/10* (2013.01); *B32B 2264/12* (2013.01); *B32B 2307/3065* (2013.01); *B32B 2307/558* (2013.01); *B32B 2307/708* (2013.01); *B32B 2307/718* (2013.01); *B32B 2603/00* (2013.01); *B32B 2605/00* (2013.01); *B32B 2605/08* (2013.01); *B32B 2605/10* (2013.01); *B32B 2605/12* (2013.01); *B32B 2605/18* (2013.01); *C08G 59/4014* (2013.01); *C08G 59/5046* (2013.01); *C08J 2379/04* (2013.01);
(Continued)

(58) Field of Classification Search
CPC .......... Y10T 428/2495; B32B 2250/05; B32B 2250/20; B32B 2260/023; B32B 2260/046; B32B 2262/106; B32B 2264/0264; B32B 2264/10; B32B 2264/12; B32B 2307/3065; B32B 2307/558; B32B 2307/708; B32B 2307/718; B32B 2603/00
USPC ........................................................ 428/212
See application file for complete search history.

(56) References Cited

U.S. PATENT DOCUMENTS

| | | | |
|---|---|---|---|
| 2010/0178487 A1 | 7/2010 | Arai et al. | |
| 2011/0313080 A1* | 12/2011 | Ihara | C08G 59/4014 523/400 |

FOREIGN PATENT DOCUMENTS

| | | |
|---|---|---|
| JP | 2007-016121 A | 1/2007 |
| JP | 2009-221460 A | 10/2009 |

(Continued)

OTHER PUBLICATIONS

Motohiro et al (JP 2007-016121 machine translation), Jul. 2005.*
International Searching Authority, International Search Report of PCT/JP2013/053208 dated Mar. 12, 2013.

*Primary Examiner* — Amber R Orlando
*Assistant Examiner* — Lawrence D Ferguson
(74) *Attorney, Agent, or Firm* — Sughrue Mion, PLLC

(57) ABSTRACT

A fiber-reinforced composite material is provided which is capable of achieving CAI, ILSS, and interlaminar fracture toughness concurrently at high levels, in particular, capable of achieving high CAI. The composite material is composed of a laminated body including a plurality of reinforcing-fiber-containing layers and a resin layer in each interlaminar region between adjacent reinforcing-fiber-containing layers, wherein the resin layer is a layer wherein a cured product of a compound having in its molecule a benzoxazine ring of formula (1) and epoxy resin is impregnated with at least polyamide 12 powder:

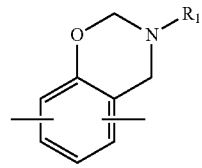

Formula (1)

(Continued)

($R_1$: C1-C12 chain alkyl group or the like; H is bonded to at least one of the carbon atoms of the aromatic ring at ortho- or para-position with respect to C to which the oxygen atom is bonded).

5 Claims, No Drawings

(51) Int. Cl.
*B32B 5/12* (2006.01)
*C08L 63/00* (2006.01)
*C08G 59/40* (2006.01)
*C08G 59/50* (2006.01)

(52) U.S. Cl.
CPC ............ *C08J 2463/02* (2013.01); *C08L 63/00* (2013.01); *Y10T 442/645* (2015.04)

(56) References Cited

FOREIGN PATENT DOCUMENTS

| | | |
|---|---|---|
| JP | 2009-286895 A | 12/2009 |
| JP | 2010-013636 A | 1/2010 |
| JP | 2011-231331 A | 11/2011 |
| WO | 2010/092723 A1 | 8/2010 |

\* cited by examiner

FIBER-REINFORCED COMPOSITE MATERIAL

CROSS REFERENCE TO RELATED APPLICATIONS

This is a National Stage of International Application No. PCT/JP2013/053208 filed Feb. 12, 2013, claiming priority based on Japanese Patent Application No. 2012-030624 filed Feb. 15, 2012, the contents of all of which are incorporated herein by reference in their entirety.

FIELD OF ART

The present invention relates to fiber-reinforced composite materials suitable for use in automobile-, railroad-vehicle-, aircraft-, ship-, and sport-related applications, as well as building components, such as windmills, and other general industry-related applications, capable of achieving various excellent mechanical properties concurrently at high levels, and capable of further weight saving.

BACKGROUND ART

Fiber-reinforced composite materials composed of various fibers and a matrix resin are widely used in automobiles, railroad vehicles, aircrafts, ships, sporting goods, and other general industrial applications for their excellent dynamical properties.

The range of applications of fiber-reinforced composite materials have recently been expanding more and more as their performance in actual use is accumulated.

As examples of such fiber-reinforced composite materials, there have been proposed those utilizing compounds having a benzoxazine ring, for example, in Patent Publications 1 and 2. These compounds having a benzoxazine ring are excellent in resistance to moisture and heat, but inferior in toughness. Attempts have been made to compensate for this defect by admixing epoxy resin or various fine resin particles.

On the other hand, there has been a demand for further weight saving of fiber-reinforced composite materials which are applied to the main structures in automobiles, railroad vehicles, aircrafts, ships, sporting goods, and other general industrial applications, by achieving, among the dynamical properties required for these applications, particularly the compression-after-impact strength (abbreviated as CAI hereinbelow), the interlaminar shear strength (abbreviated as ILSS hereinbelow) at high temperature and humidity, and the interlaminar fracture toughness, all at the same time at high levels. In addition, for maintaining high-temperature characteristics, the glass transition temperature of the resin material used therein needs to be maintained at a high level. However, it cannot be said that the examples specifically disclosed in the Patent Publications mentioned above are capable of necessarily achieving these properties concurrently at high levels.

As a technology for improving the dynamical properties, Patent Publication 3, for example, discloses to add polyamide 12 fine particles to a thermosetting resin, such as epoxy resin, for improving CAI.

Fiber-reinforced composite materials utilizing such technology are capable of maintaining the CAI at a certain high level, but are yet to achieve high CAI and ILSS at high temperature and humidity at the same time.

Patent Publication 4 discloses, as a carbon fiber composite material satisfying both CAI and ILSS concurrently at high levels, a composite material having a laminated structure of resin layers containing particular polyamide fine particles and carbon-fiber-containing layers laminated alternatively.

However, this Publication does not specifically disclose a composite material of a laminated structure containing a compound having a benzoxazine ring. Development of a material is demanded which is capable of exhibiting excellent characteristics of a compound having a benzoxazine ring, and has still more excellent CAI.

Patent Publication 1: JP-2007-16121-A
Patent Publication 2: JP-2010-13636-A
Patent Publication 3: JP-2009-286895-A
Patent Publication 4: JP-2009-221460-A

SUMMARY OF THE INVENTION

It is an object of the present invention to provide a fiber-reinforced composite material capable of achieving CAI, ILSS, and interlaminar fracture toughness concurrently at high levels, in particular, capable of achieving high CAI.

For achieving the above object, the present inventors have tried production of a composite material of a laminated structure wherein resin layers of a cured product of a particular compound having a benzoxazine ring and epoxy resin, impregnated with polyamide 12 powder, and reinforcing-fiber-containing layers are laminated. It was consequently revealed that, when a particular compound having a benzoxazine ring, epoxy resin, and polyamide 12 powder are used as starting materials under the conditions of heating and curing conventionally adopted for fiber-reinforced composite materials, a desired laminated structure is hard to be obtained, the ratio of the polyamide 12 powder in each resin layer is too small, and further improvement in objective mechanical strength and the like may little be expected. Then the present inventors have made various researches about the manufacturing conditions to find out that it is possible to give a laminated structure and increase the ratio of the polyamide 12 powder in each resin layer. The inventors have also found out that the fiber-reinforced composite material of such a laminated structure prepared from a particular compound having a benzoxazine ring has particularly excellent CAI, to complete the present invention.

According to the present invention, there is provided a fiber-reinforced composite material composed of a laminated body comprising a plurality of reinforcing-fiber-containing layers and a resin layer in each interlaminar region between adjacent reinforcing-fiber-containing layers, wherein said resin layer is a layer wherein a cured product of a compound having in its molecule a benzoxazine ring represented by formula (1) and epoxy resin is impregnated with at least polyamide 12 powder:

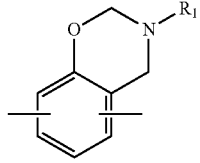

Formula (1)

wherein $R_1$ stands for a chain alkyl group having 1 to 12 carbon atoms, a cyclic alkyl group having 3 to 8 carbon atoms, a phenyl group, or a phenyl group substituted with a chain alkyl group having 1 to 12 carbon atoms or a halogen, and a hydrogen atom is bonded to at least one of the carbon atoms of the aromatic ring at ortho- or para-position with respect to the carbon atom to which the oxygen atom is bonded, wherein a ratio of said polyamide 12 powder in each resin layer is 15 to 55 vol % with respect to a total volume of the resin layer.

The fiber-reinforced composite material according to the present invention, which is of a laminated structure composed of resin layers containing a compound having a benzoxazine ring and reinforcing-fiber-containing layers, and contains a particular ratio of polyamide 12 powder in the resin layer, is capable of achieving high levels of CAI, ILSS, and interlaminar fracture toughness concurrently, and particularly excellent CAI. Thus the fiber-reinforced composite material of the present invention may suitably be used in automobile-, railroad-vehicle-, aircraft-, ship-, and sport-related applications, as well as building components, such as windmills, and other general industry-related applications.

PREFERRED EMBODIMENTS OF THE INVENTION

The present invention will now be explained in detail.

The fiber-reinforced composite material according to the present invention (sometimes abbreviated as the present composite material hereinbelow) is composed of a laminated body including a plurality of reinforcing-fiber-containing layers and a resin layer in each interlaminar region between adjacent reinforcing-fiber-containing layers, and has a laminated structure wherein the ratio of the polyamide 12 powder in each resin layer is 15 to 55 vol %, preferably 20 to 50 vol % with respect to the total volume of the resin layer. When the ratio of the polyamide 12 powder in each resin layer is less than 15 vol % with respect to the total volume of the resin layer, the content of resin is too small with respect to the content of the reinforcing fibers, so that high-level CAI may not be achieved, whereas when the ratio of the polyamide 12 powder is over 55 vol %, the content of resin is too large with respect to the content of the reinforcing fibers, so that high-level ILSS may not be achieved.

In the present invention, confirmation of the laminated structure of the reinforcing-fiber-containing layers and the resin layers, and determination of the ratio of the polyamide 12 powder in a resin layer may be performed by taking a photograph of a cross section of the laminated body under a digital microscope. The sectional area and the thickness of a resin layer and the sectional area of the polyamide 12 powder in the resin layer are measured, and the ratio of the polyamide 12 with respect to the total volume of the resin layer is calculated. As used herein, the thickness of the resin layer is the thickness of the region where no reinforcing fibers are present, and the distance between the outer surfaces of the reinforcing fibers closest to the resin layer, among the reinforcing fibers in the reinforcing-fiber-containing layers on both sides of the resin layer.

In the composite material according to the present invention, the thickness of each reinforcing-fiber-containing layer is usually 90 to 140 μm, preferably 95 to 135 μm, whereas the thickness of each resin layer is usually 10 to 60 μm, preferably 15 to 55 μm.

The composite material according to the present invention may be produced, for example, by preparing prepregs from a starting material containing a particular resin composition and reinforcing fibers through a known method, laminating the resulting prepregs, and curing the laminated prepregs under the conditions, for example, as will be discussed later.

The particular resin composition used in the composite material of the present inventioncontains, as essential components, (A) a compound having in its molecule a benzoxazine ring represented by formula (1) mentioned above, (B) epoxy resin, (C) a curing agent, and (D) polyamide 12 powder.

Component (A) used in the resin composition is a benzoxazine resin represented by formula (1) above.

In formula (1), $R_1$ stands for a chain alkyl group having 1 to 12 carbon atoms, a cyclic alkyl group having 3 to 8 carbon atoms, a phenyl group, or a phenyl group substituted with a chain alkyl group having 1 to 12 carbon atoms or a halogen.

The chain alkyl group having 1 to 12 carbon atoms may be, for example, a methyl, ethyl, propyl, isopropyl, n-butyl, isobutyl, or t-butyl group.

The cyclic alkyl group having 3 to 8 carbon atoms may be, for example, a cyclopentyl or cyclohexyl group.

The phenyl group substituted with a chain alkyl group having 1 to 12 carbon atoms or a halogen may be, for example, a phenyl, o-methylphenyl, m-methylphenyl, p-methylphenyl, o-ethylphenyl, m-ethylphenyl, p-ethylphenyl, o-t-butylphenyl, m-t-butylphenyl, p-t-butylphenyl, o-chlorophenyl, or o-bromophenyl group.

Among the above examples, a methyl, ethyl, propyl, phenyl, or o-methylphenyl group is preferred as $R_1$ for its ability to impart good handleability.

As the benzoxazine resin of component (A), for example, the monomers represented by the following formulae, oligomers obtained by polymerizing some molecules of the monomers, or reaction products of at least one of these monomers and a compound having a benzoxazine ring of a structure other than these monomers, are preferred:

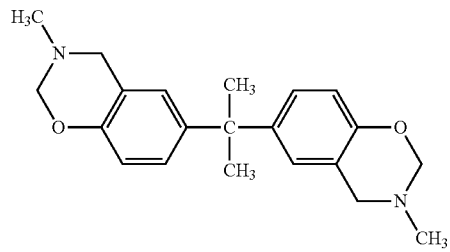

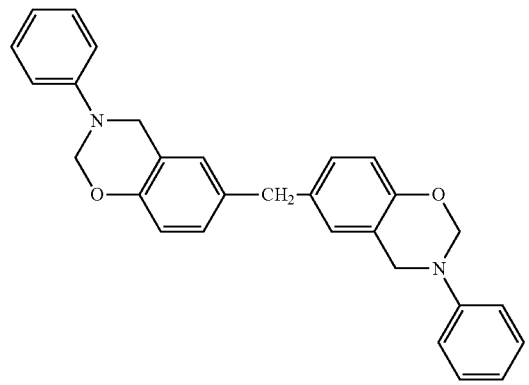

-continued
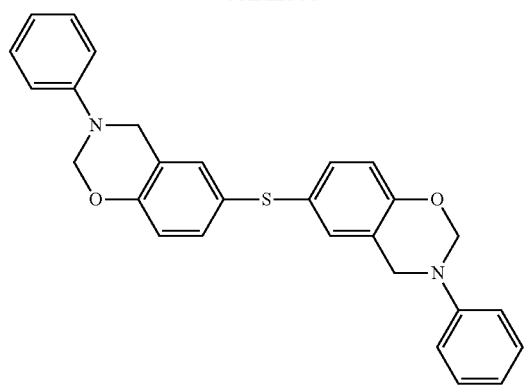
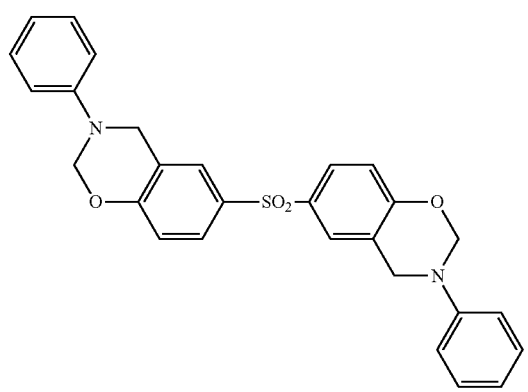
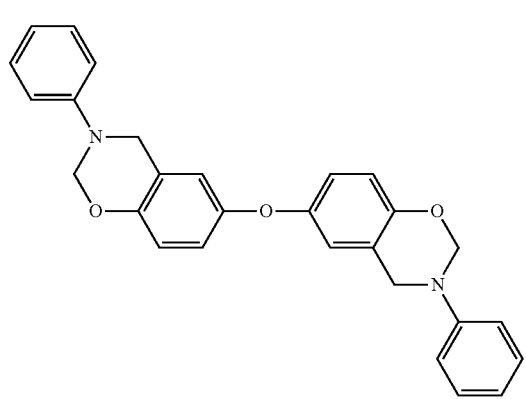
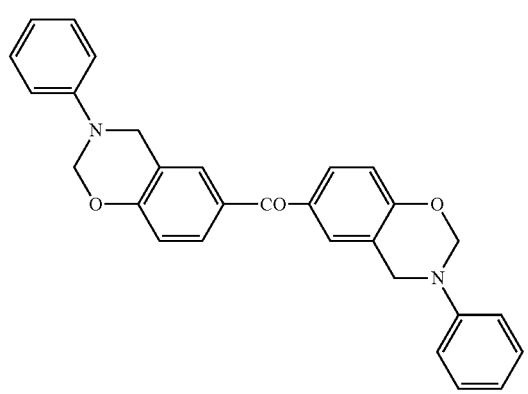
-continued
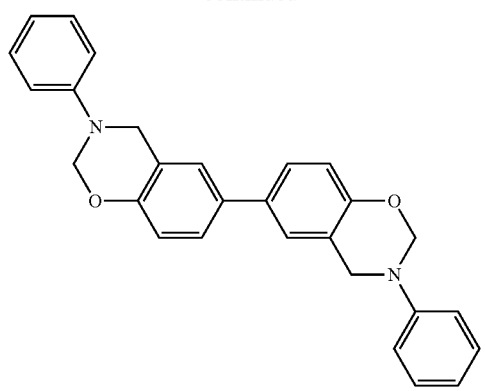
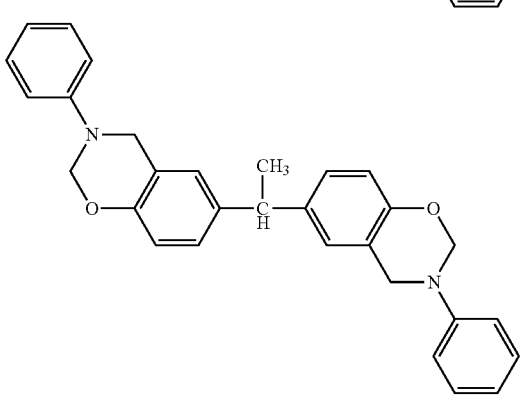

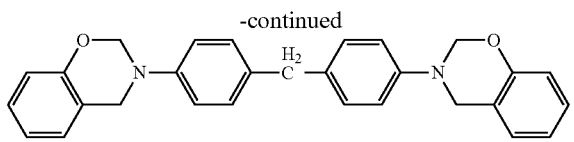

Component (A) imparts excellent resistance to fire since the benzoxazine ring undergoes ring-opening polymerization to form a skeleton similar to that of a phenol resin. Component (A), due to its dense structure, also imparts excellent mechanical properties such as low water absorption and high elasticity.

The epoxy resin of component (B) used in the resin composition of the present invention controls the viscosity of the composition and increases the curability of the composition.

Component (B) may preferably be an epoxy resin derived from a precursor compound, such as amines, phenols, carboxylic acid, or compounds having an intramolecular unsaturated carbon.

Examples of the epoxy resins derived from precursor amines may include glycidyl compounds, such as tetraglycidyl diamino diphenyl methane or xylene diamine, triglycidyl amino phenol, or glycidyl aniline; position isomers thereof; or alkyl group- or halogen-substituted products thereof.

In the following, when commercial products are referred to as examples, complex viscoelasticity η* at 25° C. measured with the dynamic viscoelastometer to be discussed later is mentioned as a viscosity for those in a liquid form.

Examples of commercial products of tetraglycidyl diamino diphenyl methane may include SUMIEPDXY (registered trademark, omitted hereinafter) ELM434 (manufactured by SUMITOMO CHEMICAL CO., LTD.), ARALDITE (registered trademark, omitted hereinafter) MY720, ARALDITE MY721, ARALDITE MY9512, ARALDITE MY9612, ARALDITE MY9634, ARALDITE MY9663 (all manufactured by HUNTSMAN ADVANCED MATERIALS), and jER (registered trademark, omitted hereinafter) 604 (manufactured by MITSUBISHI CHEMICAL).

Examples of commercial products of triglycidyl amino phenol may include jER 630 (viscosity: 750 mPa·s) (manufactured by MITSUBISHI CHEMICAL), ARALDITE MY0500 (viscosity: 3500 mPa·s) and MY0510 (viscosity: 600 mPa·s) (both manufactured by HUNTSMAN ADVANCED MATERIALS), and ELM100 (viscosity: 16000 mPa·s) (manufactured by SUMITOMO CHEMICAL CO., LTD.).

Examples of commercial products of glycidyl anilines may include GAN (viscosity: 120 mPa·s) and GOT (viscosity: 60 mPa·s) (both manufactured by NIPPON KAYAKU CO., LTD.).

Examples of epoxy resins of glycidyl ether type derived from precursor phenols may include bisphenol A type epoxy resin, bisphenol F type epoxy resin, bisphenol S type epoxy resin, epoxy resin having a biphenyl skeleton, phenol novolak type epoxy resin, cresol novolak type epoxy resin, resorcinol type epoxy resin, epoxy resin having a naphthalene skeleton, trisphenylmethane type epoxy resin, phenol aralkyl type epoxy resin, dicyclopentadiene type epoxy resin, or diphenylfluorene type epoxy resin; various isomers thereof; and alkyl group- or halogen-substituted products thereof.

Epoxy resins obtained by modifying an epoxy resin derived from a precursor phenol with urethane or isocyanate are also included in this type.

Examples of commercial products of liquid bisphenol A type epoxy resins may include jER 825 (viscosity: 5000 mPa·s), jER826 (viscosity: 8000 mPa·s), jER827 (viscosity: 10000 mPa·s), jER 828 (viscosity: 13000 mPa·s) (all manufactured by MITSUBISHI CHEMICAL), EPICLON (registered trademark, omitted hereinafter) 850 (viscosity: 13000 mPa·s) (manufactured by DIC CORPORATION), EPOTOHTO (registered trademark, omitted hereinafter) YD-128 (viscosity: 13000 mPa·s) (manufactured by NIPPON STEEL CHEMICAL), DER-331 (viscosity: 13000 mPa·s), and DER-332 (viscosity: 5000 mPa·s) (manufactured by THE DOW CHEMICAL COMPANY).

Examples of commercial products of solid or semisolid bisphenol A type epoxy resins may include jER 834, jER 1001, jER 1002, jER 1003, jER 1004, jER 1004AF, jER 1007, and jER 1009 (all manufactured by MITSUBISHI CHEMICAL).

Examples of commercial products of liquid bisphenol F type epoxy resins may include jER 806 (viscosity: 2000 mPa·s), jER 807 (viscosity: 3500 mPa·s), jER 1750 (viscosity: 1300 mPa·s), jER (all manufactured by MITSUBISHI CHEMICAL), EPICLON 830 (viscosity: 3500 mPa·s) (manufactured by DIC CORPORATION), EPOTOHTO YD-170 (viscosity: 3500 mPa·s), and EPOTOHTO YD-175 (viscosity: 3500 mPa·s) (both manufactured by NIPPON STEEL CHEMICAL).

Examples of commercial products of solid bisphenol F type epoxy resins may include jER 4004P, jER 4007P, jER 4009P (all manufactured by MITSUBISHI CHEMICAL), EPOTOHTO YDF2001, and EPOTOHTO YDF2004 (both manufactured by NIPPON STEEL CHEMICAL).

Examples of bisphenol S type epoxy resins may include EXA-1515 (manufactured by DIC CORPORATION).

Examples of commercial products of epoxy resins having a biphenyl skeleton may include jER YX4000H, jER YX4000, jER YL6616 (all manufactured by MITSUBISHI CHEMICAL), and NC-3000 (manufactured by NIPPON KAYAKU CO., LTD.).

Examples of commercial products of phenol novolak type epoxy resins may include jER152, jER154 (both manufactured by MITSUBISHI CHEMICAL), EPICLON N-740, EPICLON N-770, and EPICLON N-775 (all manufactured by DIC CORPORATION).

Examples of commercial products of cresol novolak type epoxy resins may include EPICLON N-660, EPICLON N-665, EPICLON N-670, EPICLON N-673, EPICLON N-695 (all manufactured by DIC CORPORATION), EOCN-1020, EOCN-1025, and EOCN-104S (all manufactured by NIPPON KAYAKU CO., LTD.).

Examples of commercial products of resorcinol type epoxy resins may include DENACOL (registered trademark, omitted hereinafter) EX-201 (viscosity: 250 mPa·s) (manufactured by NAGASE CHEMTEX CORPORATION).

Examples of commercial products of epoxy resins having a naphthalene skeleton may include EPICLON HP4032 (manufactured by DIC CORPORATION), NC-7000, and NC-7300 (both manufactured by NIPPON KAYAKU CO., LTD.).

Examples of commercial products of trisphenylmethane type epoxy resins may include TMH-574 (manufactured by SUMITOMO CHEMICAL CO., LTD.).

Examples of commercial products of dicyclopentadiene type epoxy resins may include EPICLON HP7200, EPICLON HP7200L, EPICLON HP7200H (all manufactured by DIC CORPORATION), Tactix (registered trademark) 558 (manufactured by HUNTSMAN ADVANCED MATERIALS), XD-1000-1L, and XD-1000-2L (both manufactured by NIPPON KAYAKU CO., LTD.).

Examples of commercial products of epoxy resins modified with urethane or isocyanate may include AER4152 (manufactured by ASAHI KASEI E-MATERIALS CORP.) having an oxazolidone ring.

Examples of epoxy resins derived from precursor carboxylic acid may include glycidylated phthalic acid, hexahydrophthalic acid, glycidylated dimer acid, and various isomers thereof.

Examples of commercial products of diglycidyl phthalate may include EPOMIK (registered trademark, omitted hereinafter) R508 (viscosity: 4000 mPa·s) (manufactured by MITSUI CHEMICALS INC.) and DENACOL EX-721 (viscosity: 980 mPa·s) (manufactured by NAGASE CHEMTEX CORPORATION).

Examples of commercial products of diglycidyl hexahydrophthalate may include EPOMIK R540 (viscosity: 350 mPa·s) (manufactured by MITSUI CHEMICALS INC.) and AK-601 (viscosity: 300 mPa·s) (manufactured by NIPPON KAYAKU CO., LTD.).

Examples of commercial products of diglycidyl ester of dimer acid may include jER 871 (viscosity: 650 mPa·s) (manufactured by MITSUBISHI CHEMICAL) and EPOTOHTO YD-171 (viscosity: 650 mPa·s) (manufactured by NIPPON STEEL CHEMICAL).

Examples of epoxy resins derived from precursor compounds having intramolecular unsaturated carbon may include alicyclic epoxy resins.

More specifically, examples of commercial products of (3',4'-epoxycyclohexane) methyl-3,4-epoxycyclohexane carboxylate may include CELLOXIDE (registered trademark, omitted hereinafter) 2021P (viscosity: 250 mPa·s) (manufactured by DAICEL CHEMICAL INDUSTRIES, LTD.) and CY179 (viscosity: 400 mPa·s) (manufactured by HUNTSMAN ADVANCED MATERIALS), examples of commercial products of (3',4'-epoxycyclohexane) octyl-3,4-epoxycyclohexane carboxylate may include CELLOXIDE 2081 (viscosity: 100 mPa·s) (manufactured by DAICEL CHEMICAL INDUSTRIES, LTD.), and examples of commercial products of 1-methyl-4-(2-methyloxiranyl)-7-oxabiscyclo[4.1.0]heptane may include CELLOXIDE 3000 (viscosity: 20 mPa·s) (manufactured by DAICEL CHEMICAL INDUSTRIES, LTD.).

The 25° C. viscosity of epoxy resins which are in liquid form at 25° C. is lower the better in view of tackiness and draping properties. The 25° C. viscosity of the epoxy resins is preferably not lower than 5 mPa·s, which is the minimum available as a commercial epoxy resin, and not higher than 20000 mPa·s, more preferably not lower than 5 mPa·s and not higher than 15000 mPa·s. At over 20000 mPa·s, tackiness and draping properties may be deteriorated.

Epoxy resins in solid form at 25° C. are preferable for their higher aromatic contents, which imparts improved fire resistance, and examples may include epoxy resins having a biphenyl skeleton, epoxy resins having a naphthalene skeleton, or phenolaralkyl type epoxy resins.

In the resin composition, preferred contents of components (A) and (B) are usually 65 to 78 mass %, preferably 70 to 75 mass % of component (A), and usually 22 to 35 mass %, preferably 25 to 30 mass % of component (B), respectively, with the total of components (A) and (B) being 100 mass %. When the content of component (A) is less than 65 mass %, while the content of component (B) is over 35 mass %, the ILSS of the resulting fiber-reinforced composite material is low, and the glass transition temperature of the cured resin product is low.

The curing agent of component (C) in the resin composition may be, for example, one or a mixture of two or more of aromatic amines, such as diethyl toluene diamine, meta phenylene diamine, diamino diphenyl methane, diamino diphenyl sulfone, meta xylene diamine, and derivatives thereof; aliphatic amines, such as triethylenetetramine and isophoronediamine; imidazole derivatives; dicyandiamide; tetramethylguanidine; carboxylic acid anhydrides, such as methylhexahydrophthalic anhydrides; carboxylic hydrazide, such as adipic hydrazide; carboxylic amide; monofunctional phenol; polyfunctional phenol compounds, such as bisphenol A; bis(4-hydroxyphenyl)sulfide; polyphenol compounds; polymercaptan; carboxylic acid salts; and Lewis acid complex, such as boron trifluoride ethylamine complex. Among these, one or a mixture of two or more of aromatic amines, sulfonic acid esters, monofunctional phenol or polyfunctional phenol compounds, such as bisphenol A, and polyphenol compounds are preferred.

The curing agent reacts with the benzoxazine of component (A) and the epoxy resin of component (B) to give a fiber-reinforced composite material having excellent resistance to heat and moisture.

In the resin composition, the content of component (C) is usually 5 to 20 parts by mass, preferably 7 to 15 parts by mass with respect to 100 parts by mass of components (A) and (B) together. At less than 5 parts by mass, the curing reaction is slow, so that high temperature and long reaction time are required for increasing the cure degree of the entire resin composition. At over 20 parts by mass, mechanical properties, such as the glass transition temperature of the cured product may be poor.

The polyamide 12 powder of component (D) of the resin composition may preferably be capable of maintaining the powder state in the present composition and have a melting point of preferably not lower than 170° C., more preferably 175 to 185° C. As used herein, the melting point is a temperature at which the melting heat is at the peak as measured with a differential scanning calorimeter at a temperature raising rate of 10° C. per minute.

As the polyamide 12 powder of component (D), it is preferred to separately use polyamide 12 powder (D1) having an average particle size of not smaller than 1 μm and smaller than 15 μm, preferably not smaller than 5 μm and smaller than 15 μm, or polyamide 12 powder (D2) not smaller than 15 μm and not larger than 60 μm, preferably not smaller than 15 μm and not larger than 30 μm. The reason for distinguishing component (D1) from component (D2) by their average particle sizes is that regulating the contents of these components to be different will facilitate achievement of the desired effects of the present invention.

As used herein, the average particle size refers to an average of the long axis diameter of each of the 100 arbitrarily-selected particles measured under a scanning electron microscope (SEM) at an enlargement of ×200 to ×500.

Component (D) may be a commercial product, such as VESTOSINT1111, VESTOSINT2070, VESTOSINT2157, VESTOSINT2158, or VESTOSINT2159 (all registered trademarks, manufactured by DAICEL-EVONIK LTD.).

Component (D) is preferably spherical particles so as not to impair the fluidity of the resin composition, but aspherical particles may also be used.

The content of component (D1), when used as component (D), is 20 to 30 parts by mass, preferably 20 to 25 parts by mass with respect to 100 parts by mass of components (A) and (B) together. At less than 20 parts by mass, the CAI is low, whereas at over 30 parts by mass, the ILSS may be low.

The content of component (D2), when used as component (D), is not less than 5 parts by mass and less than 20 parts by mass, preferably 7 to 18 parts by mass with respect to 100 parts by mass of components (A) and (B) together. At less than 5 parts by mass, the CAI and the toughness may be low, whereas at not less than 20 parts by mass, the ILSS may be low.

The resin composition preferably contains (E) a toughness improver for further improving the toughness of the resulting composite material. Component (E) is dispersible in the resin composition, and may be at least one member selected from the group consisting of inorganic fine particles, organic fine particles, or a liquid resin or a resin monomer having inorganic and/or organic fine particles dispersed therein.

As used herein, dispersion means that the fine particles of component (E) are dispersed in the composition, and the fine particles and the constituents of the composition have mutual affinities and are in a uniform or commingled state.

Examples of the liquid resin or the resin monomer may include reactive elastomers, HYCAR CTBN modified epoxy resins, HYCAR CTB modified epoxy resins, urethane-modified epoxy resins, epoxy resins to which nitrile rubber is added, epoxy resins to which cross-linked acrylic rubber fine particles are added, silicon-modified epoxy resins, and epoxy resins to which thermoplastic elastomer is added.

Examples of the organic fine particles may include thermosetting resin fine particles, thermoplastic resin fine particles, and mixtures thereof.

Examples of the thermosetting resin fine particles may include epoxy resin fine particles, phenol resin fine particles, melamine resin fine particles, urea resin fine particles, silicon resin fine particles, urethane resin fine particles, and mixtures thereof.

Examples of the thermoplastic resin fine particles may include copolymerized polyester resin fine particles, phenoxy resin fine particles, polyimide resin fine particles, polyamide resin fine particles, acrylic fine particles, butadiene-acrylonitrile resin fine particles, styrene fine particles, olefin fine particles, nylon fine particles, butadiene-alkylmethacrylate-styrene copolymers, acrylate-methacrylate copolymers, and mixtures thereof.

As acrylic fine particles, Nanostrength M22 (trade name, manufactured by ARKEMA) may be used, which is a commercially available methyl methacrylate-butylacrylate-methyl methacrylate copolymer.

The acrylic fine particles may be produced by: (1) polymerization of monomers, (2) chemical processing of polymers, or (3) mechanical pulverization of polymers. Method (3), however, is not preferred since particles obtained by this method are not fine and irregular in shape.

The polymerization may be carried out by, for example, emulsion polymerization, soap-free emulsion polymerization, dispersion polymerization, seed polymerization, suspension polymerization, or combination thereof. Among these, emulsion polymerization and/or seed polymerization may be employed to provide fine particles having minute diameters and a partially cross-linked, core/shell, hollow, or polar (epoxy, carboxyl, or hydroxyl group or the like) structure.

Examples of commercially available core/shell fine particles may include STAFILOID AC3355 (trade name, manufactured by GANZ CHEMICAL CO., LTD.), F351 (trade name, manufactured by ZEON CORPORATION), KUREHA PARALOID EXL-2655 (trade name, manufactured by KUREHA CHEMICAL INDUSTRY CO., LTD.), and MX120 (trade name, manufactured by KANEKA CORPORATION).

The content of component (E), when contained, in the resin composition is preferably 3 to 20 parts by mass, more preferably 5 to 15 parts by mass with respect to 100 parts by mass of components (A) and (B) together. At less than 3 parts by mass, the toughness of the resin composition may not be improved and may cause generation of cracks during curing of the resin composition, whereas at over 20 parts by mass, the heat resistance of the resin composition may be low.

The present composition may optionally contain, for example, nanocarbon, flame retardant, or mold release agent, as long as the properties of the composition are not impaired.

Examples of nanocarbon may include carbon nanotubes, fullerene, and derivatives thereof.

Examples of the flame retardant may include red phosphorus; phosphoric acid esters, such as triphenyl phosphate, tricresyl phosphate, trixylenyl phosphate, cresyldiphenyl phosphate, xylenyldiphenyl phosphate, resorcinol bisphenyl phosphate, and bisphenol A bisdiphenyl phosphate; and boric acid esters.

Examples of the mold release agent may include silicon oil, stearic acid esters, and carnauba wax.

The resin composition may be kneaded by any process without particular limitation, and may be kneaded in, for example, a kneader, planetary mixer, twin-screw extruder, or the like. For dispersion of the particle components, it is preferred to spread the particles in advance in the liquid resin component of the benzoxazine resin composition by means of a homo mixer, three-roll mill, ball mill, beads mill, or ultrasound. The processes, such as mixing with a matrix resin or preliminary spreading of the particles, may be carried out under heating/cooling and/or increased/reduced pressure, as required. It is preferred for good storage stability to immediately store the kneaded product in a refrigerator or a freezer.

The viscosity of the resin composition is preferably 10 to 3000 Pa·s, more preferably 10 to 2500 Pa·s, most preferably 100 to 2000 Pa·s, at 50° C. in view of the tackiness and draping properties. At less than 10 Pa·s, the change in tackiness of the resin composition with the lapse of time due to resin absorption into the reinforcing-fiber-containing layer may be remarkable. At over 3000 Pa·s, the tackiness is low and the draping property may be deteriorated.

The reinforcing fibers used in the production of the composite material of the present invention may preferably be, for example, glass, carbon, graphite, aramid, boron, alumina, or silicon carbide fibers. A mixture of two or more of these fibers may be used, and for providing lighter and more durable molded products, carbon fibers and graphite fibers are preferably used.

In the present invention, various kinds of carbon fibers and graphite fibers may be used depending on the application. For providing composite materials having excellent impact resistance, high rigidity, and good mechanical strength, the fibers preferably have a tensile modulus of elasticity measured by a strand tensile test of 150 to 650 GPa, more preferably 200 to 550 GPa, most preferably 230 to 500 GPa.

As used herein, the strand tensile test refers to a test wherein a bundle of reinforcing fibers are impregnated with a resin of the composition to be mentioned below, cured at 130° C. for 35 minutes, and the measurement is made according to JIS R7601 (1986).

The form of the reinforcing fibers is not particularly limited, and may be unidirectionally oriented continuous fibers, tow, fabrics, mats, knits, braids, and short fibers chopped into a length of less than 10 mm.

As used herein, the continuous fibers are monofilaments or fiber bundles which are substantially continuous for 10 mm or more. The short fibers are fiber bundles chopped into the length of less than 10 mm. For the applications particularly requiring high specific strength and specific elasticity, the reinforcing fiber bundles are most preferably unidirectionally oriented in arrangement, but easily handleable cloth (fabrics) may also be suitably used in the present invention.

The prepreg for preparing the composite material of the present invention is obtained by impregnating the reinforcing fibers with the resin composition.

The impregnation may be carried out by a wet method wherein the resin composition is dissolved in a solvent, such as methyl ethyl ketone or methanol, to lower its viscosity and infiltrated, or by a hot melt method (dry method) wherein the resin composition is heated to lower its viscosity and infiltrated.

The wet method includes soaking the reinforcing fibers in a solution of the resin composition, drawing the fibers up, and evaporating the solvent in an oven or the like. The hot melt method includes directly impregnating the reinforcing fibers with the resin composition, of which viscosity has been lowered by heating; or applying the resin composition onto a release paper or the like to prepare a film of the composition, overlaying the reinforcing fibers with the film on one or both sides, and subjecting the fibers with the film to heat and pressure to infiltrate the resin into the reinforcing fibers.

The hot melt method is preferred for substantially no solvent remaining in the obtained prepreg.

The obtained prepreg preferably has a reinforcing fiber content per unit area of 70 to 3000 $g/m^2$. At less than 70 $g/m^2$, increased layers of prepreg are required for giving a predetermined thickness to the composite material of the present invention, which may complicate the operation. On the other hand, at over 3000 $g/m^2$, the draping property of the prepreg tends to be deteriorated. When the prepreg is planar or simply curved, the reinforcing fiber content may exceed 3000 $g/m^2$. The weight fraction of reinforcing fibers is preferably 30 to 90 mass %, more preferably 35 to 85 mass %, most preferably 40 to 80 mass %. At less than 30 mass %, the excess amount of resin may disturb the advantages of the composite material excellent in specific strength and specific elasticity, or excess amount of heat may be generated upon curing during molding of the composite material. At a weight fraction of reinforcing fibers of over 90 mass %, impregnation defect of the resin may occur, resulting in composite materials with increased voids.

The composite material of the present invention may be obtained, for example, by laminating the prepregs, and heating and curing the resin under particular conditions while pressure is applied to the laminate.

If the heating and curing is carried out by holding under conventional conditions at about 180° C. for 1 to 5 hours, the above-mentioned ratio of the polyamide 12 powder in the resin layer cannot be achieved in the laminated structure of the resulting composite material, and consequently the desired effects of the present invention cannot be achieved.

The conditions of heating and curing for producing the composite material of the present invention may be, for example, heating a laminate of the prepregs from room temperature to 160 to 200° C. in multiple stages under pressure, or heating the laminate from room temperature to 160 to 200° C. at a raising rate of 0.1 to 5° C./min. The total length of heating is usually 0.5 to 30 hours, and preferably the laminate is held, when the temperature reaches 160 to 200° C., for 1 to 5 hours.

The heat and pressure may be applied, for example, by press molding, autoclave molding, vacuum molding, tape-wrapping, or internal pressure molding.

The tape-wrapping includes winding prepreg around a core, such as a mandrel, to form a tubular body of the composite material, and is suitable for producing rod-shaped articles, such as golf shafts and fishing rods. More specifically, prepreg is wound around a mandrel, a wrapping tape made of a thermoplastic film is wound over the prepreg for fixing and applying pressure to the prepreg, heat-curing the resin in an oven, and withdrawing the mandrel, to obtain a tubular body.

The internal pressure molding includes wrapping prepreg around an inner pressure support, such as a thermoplastic resin tube, to give a preform, setting the preform in a mold, and introducing a highly pressurized gas into the internal pressure support to apply pressure to the preform while heating the mold to obtain a shaped product. This method is suitable for producing articles with complicated forms, such as golf shafts, bats, and tennis or badminton rackets.

The composite material of the present invention may alternatively be obtained by directly impregnating a reinforcing fiber substrate with the resin composition and curing the resin. For example, the composite material may be obtained by placing a reinforcing fiber substrate in a mold, pouring the resin composition into the mold to impregnate the substrate with the composition, and curing the composition; or by laminating reinforcing fiber substrates and films of the resin composition, and applying heat and pressure to the laminate.

As used herein, the films of the resin composition refer to films prepared by applying a predetermined amount of the resin composition in a uniform thickness onto a release paper or a release film. The reinforcing fiber substrate may be unidirectionally oriented continuous fibers, bidirectional fabrics, nonwoven fabrics, mats, knits, or braids.

The term "laminate" encompasses not only simply overlaying reinforcing fiber substrates one on another, but also preforming by adhering the reinforcing fiber substrates onto various molds or core materials.

The core materials may preferably be foam cores or honeycomb cores. The foam cores may preferably be made of urethane or polyimide. The honeycomb cores may preferably be aluminum cores, glass cores, or aramid cores.

The composite material of the present invention has a compression-after-impact strength (CAI) of usually not lower than 230 MPa, preferably not lower than 280 MPa, an interlaminar shear strength (ILSS) of usually not lower than 40 MPa, preferably not lower than 50 MPa, and an interlaminar fracture toughness of usually not lower than 1000 $J/m^2$, preferably not lower than 1400 $J/m^2$, all as measured under the conditions to be discussed later in Examples.

EXAMPLES

The present invention will now be explained specifically with reference to Examples, which are not intended to limit the present invention. Various properties were determined by the following methods. The results are shown in Tables 1 and 2.

Examples 1 to 6 and Comparative Examples 1 and 2

In each of the Examples and Comparative Examples, the starting material were mixed at a ratio shown in Tables 1 and 2 to prepare a resin composition.

The starting materials used are as follows:
Component (A): Benzoxazine Resin
F-a (bisphenol F-aniline type, manufactured by SHIKOKU CHEMICALS CORPORATION)
P-a (phenol-aniline type, manufactured by SHIKOKU CHEMICALS CORPORATION)
Component (B): Epoxy Resin
CELLOXIDE (registered trademark) 2021P (manufactured by DAICEL CHEMICAL INDUSTRIES, LTD.)
bisphenol A type diglycidyl ether (YD-128, manufactured by NIPPON STEEL CHEMICAL)
Component (C): Curing Agent
bis(4-hydroxyphenyl) sulfide (manufactured by TOKYO CHEMICAL INDUSTRY CO., LTD.)
Component (D)
VESTOSINT (registered trademark) 2157 (polyamide 12 with average particle size of 55 µm, manufactured by DAICEL-EVONIK LTD.)
VESTOSINT (registered trademark) 2158 (polyamide 12 with average particle size of 20 µm, manufactured by DAICEL-EVONIK LTD.)
VESTOSINT (registered trademark) 2159 (polyamide 12 with average particle size of 10 µm, manufactured by DAICEL-EVONIK LTD.)
VESTOSINT (registered trademark) 2170 (polyamide 12 with average particle size of 5 µm, manufactured by DAICEL-EVONIK LTD.)
Component (E): Toughness Improver
Nanostrength (M22, manufactured by ARKEMA)
<Prepreg Tackiness Test>

The obtained resin composition was applied to a release paper, and obtained a resin film. Two of the films were arranged on and beneath unidirectionally-oriented carbon fibers to infiltrate, thereby giving prepreg. The carbon fiber content per unit area of this prepreg was 150 g/m$^2$, and the matrix resin content per unit area was 67 g/m$^2$.

The tackiness of the obtained prepreg was determined by touching. Immediately after the release paper was peeled off of the prepreg surface, the prepreg was pressed with a finger. Those having moderate tackiness were marked with "○", those having slightly too much or too little tackiness were marked with "Δ", and those having too much tackiness and unable to be peeled off of the finger, and those having too little tackiness and unable to stick to the finger were marked with "x".

<Measurement of CAI>

The obtained prepregs were quasi-isotropically laminated in 32 plies in the [+45°/0°/−45°/90°]$_{4s}$ structure, and cured in an autoclave under heating stepwise from room temperature to 180° C., and at 180° C. for 2 hours, to thereby obtain CFRP. According to SACMA SRM 2R-94, a specimen of 150 mm in length×100 mm in width was cut out from the CFRP, and drop weight impact at 6.7 J/mm was given on the specimen in the center to determine the compression-after-impact strength.

<Measurement of ILSS>

The obtained prepregs were laminated in 12 plies in the direction of 0 degree, and cured in an autoclave under heating stepwise from room temperature to 180° C., and at 180° C. for 2 hours, to thereby obtain CFRP. According to ASTM D2402-07, a rectangular specimen of 13 mm in the 0° direction and 6.35 mm in width was cut out from the CFRP, and according to ASTM D2402-07, the specimen was soaked in warm water at 71° C. for 2 weeks to fully absorb water. Then the interlaminar shear strength of the specimen was determined at 82° C.

<Measurement of Interlaminar Fracture Toughness>

The obtained prepregs were laminated in 26 plies in the direction of 0 degree, and cured in an autoclave under heating stepwise from room temperature to 180° C., and at 180° C. for 2 hours, to thereby obtain CFRP. According to JIS K7086, a rectangular specimen of 250 mm in the 0° direction and 25 mm in width was cut out from the CFRP, and subjected to the measurement.

<Confirmation of Reinforcing-Fiber-Containing Layers and Resin Layers, and Measurement of Polyamide 12 Powder in Resin Layer>

The obtained prepregs were quasi-isotropically laminated in 32 plies in the [+45°/0°/−45°/90°]$_{4s}$ structure, and cured in an autoclave under heating stepwise from room temperature to 180° C., and at 180° C. for 2 hours, to thereby obtain CFRP. The obtained CFRP was cut, and the cut surface was polished. The polished cut surface was photographed under a microscope (manufactured by KEYENCE CORPORATION). The sectional area and the thicknesses of the resin layer and the sectional area of the polyamide 12 particles in the resin layer were determined on the photograph, and the ratio of the polyamide 12 with respect to the total volume of the resin layer was calculated.

TABLE 1

| | Starting Material | Ex 1 | Ex 2 | Ex 3 | Ex 4 | Ex 5 | Ex. 6 |
|---|---|---|---|---|---|---|---|
| (A) | F-a | 70 | 70 | 70 | 70 | 70 | 70 |
| | P-a | | | 5 | | 5 | |
| (B) | CELLOXIDE 2021P | 30 | 30 | 25 | 30 | 25 | 30 |
| (C) | Bis(4-hydroxyphenyl) sulfide | 10 | 10 | 10 | 10 | 10 | 10 |
| (E) | M22 | 7.5 | 7.5 | 6.25 | 7.5 | 6.25 | 7.5 |
| | Phenoxy resin YP-70 | | | | | | |
| (D) | VESTOSINT 2157 (55 µm) | 10 | | | | | |
| | VESTOSINT 2158 (20 µm) | | 10 | 16 | | | |
| | VESTOSINT 2159 (10 µm) | | | | 10 | 20 | |
| | VESTOSINT 2170 (5 µm) | | | | | | 23 |
| Result of Measurement | Content of polyamide 12 vol % | 20 | 21 | 40 | 16 | 32 | 34 |
| | CAI RT/DRY MPa | 268 | 272 | 339 | 235 | 300 | 305 |
| | ILSS 82° C./WET MPa | — | 67 | 63 | 70 | 52 | 50 |
| | Prepreg tacking property | Δ | ○ | ○ | ○ | ○ | Δ |
| | Interlaminar fracture toughness $G_{IC}$ RT/DRY J/m$^2$ | — | 1400 | 2070 | — | — | — |

TABLE 1-continued

| Starting Material | Ex 1 | Ex 2 | Ex 3 | Ex 4 | Ex 5 | Ex. 6 |
|---|---|---|---|---|---|---|
| Curing conditions | Multistage heating temperature raising rate: 2° C./min | | | | | |

TABLE 2

| | Starting Material | Comp. Ex 1 | Comp. Ex 2 |
|---|---|---|---|
| (A) | F-a | 70 | 70 |
| | P-a | | |
| (B) | CELLOXIDE 2021P | 30 | 30 |
| (C) | Bis(4-hydroxyphenyl) sulfide | 10 | 10 |
| (E) | M22 | 7.5 | 7.5 |
| | Phenoxy resin YP-70 | | |
| (D) | VESTOSINT 2157 (55 μm) | | |
| | VESTOSINT 2158 (20 μm) | 30 | |
| | VESTOSINT 2159 (10 μm) | | 5 |
| Result of Measurement | Content of polyamide 12 vol % | 56 | 12 |
| | CAI RT/DRY MPa | 365 | 199 |
| | ILSS 82° C./WET MPa | 38 | 75 |
| | Prepreg tacking property | x | o |
| | Interlaminar fracture toughness $G_{IIC}$ RT/DRY J/m² | — | — |
| Curing Conditions | | — | |

From Table 2, it is seen that, in Comparative Example 1, the ratio in volume of the polyamide 12 in the resin layer was high, ILSS was low, and the tackiness of the prepreg was poor, and in Comparative Example 2, the ratio in volume of the polyamide 12 in the resin layer was low, and CAI was low.

What is claimed is:

1. A fiber-reinforced composite material composed of a laminated body comprising a plurality of reinforcing-fiber-containing layers and a resin layer in each interlaminar region between adjacent reinforcing-fiber-containing layers, wherein said resin layer is a layer wherein a cured product of a compound (A) having in its molecule a benzoxazine ring of Formula (1) and epoxy resin (B) is impregnated with at least polyamide 12 powder:

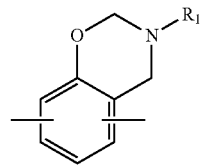

Formula (1)

wherein $R_1$ stands for a chain alkyl group having 1 to 12 carbon atoms, a cyclic alkyl group having 3 to 8 carbon atoms, a phenyl group, or a phenyl group substituted with a chain alkyl group having 1 to 12 carbon atoms or a halogen, and a hydrogen atom is bonded to at least one of the carbon atoms of the aromatic ring at ortho- or para-position with respect to the carbon atom to which the oxygen atom is bonded, wherein a ratio of said polyamide 12 powder in each resin layer is 15 to 21 vol % with respect to a total volume of the resin layer.

2. The composite material according to claim 1, wherein said polyamide 12 powder has an average particle size of not smaller than 1 μm and smaller than 15 μm.

3. The composite material according to claim 1, wherein said polyamide 12 powder has an average particle size of not smaller than 15 μm and smaller than 60 μm.

4. The composite material according to claim 1, wherein said rein layer contains a toughness improver.

5. The composite material according to claim 4, wherein said toughness improver is at least one member selected from the group consisting of inorganic fine particles, organic fine particles, a liquid resin having inorganic and/or organic fine particles dispersed therein, and a resin monomer having inorganic and/or organic fine particles dispersed therein.

* * * * *